United States Patent
Rao

(10) Patent No.: US 8,515,425 B2
(45) Date of Patent: Aug. 20, 2013

(54) UPLINK CARRIER HANDOFF AND METHOD FOR PATH LOSS BASED TRIGGERING OF UPLINK CARRIER HANDOFF

(75) Inventor: Anil Rao, Cedar Knolls, NJ (US)

(73) Assignee: Alcatel Lucent, Paris (FR)

( * ) Notice: Subject to any disclaimer, the term of this patent is extended or adjusted under 35 U.S.C. 154(b) by 1085 days.

(21) Appl. No.: 12/000,967

(22) Filed: Dec. 19, 2007

(65) Prior Publication Data

US 2009/0163208 A1 Jun. 25, 2009

(51) Int. Cl.
*H04W 36/00* (2009.01)

(52) U.S. Cl.
USPC ........... 455/436; 455/437; 455/438; 455/439; 455/440; 455/441; 455/442; 455/443; 455/444; 370/331; 370/332; 370/333

(58) Field of Classification Search
USPC .......................... 455/436–444; 370/331–333
See application file for complete search history.

(56) References Cited

U.S. PATENT DOCUMENTS

| | | | |
|---|---|---|---|
| 6,519,461 B1 * | 2/2003 | Andersson et al. | 455/453 |
| 6,611,506 B1 * | 8/2003 | Huang et al. | 370/329 |
| 6,690,936 B1 * | 2/2004 | Lundh | 455/436 |
| 7,453,912 B2 * | 11/2008 | Laroia et al. | 370/526 |
| 2003/0133420 A1 * | 7/2003 | Haddad | 370/319 |
| 2004/0106412 A1 * | 6/2004 | Laroia et al. | 455/448 |
| 2006/0209767 A1 * | 9/2006 | Chae et al. | 370/335 |
| 2008/0316969 A1 * | 12/2008 | Prakash et al. | 370/331 |
| 2009/0219893 A1 * | 9/2009 | Korpela et al. | 370/332 |
| 2009/0323637 A1 * | 12/2009 | Kashiwase et al. | 370/331 |

FOREIGN PATENT DOCUMENTS

| | | |
|---|---|---|
| CN | 1659901 A | 8/2005 |
| CN | 1666537 A | 9/2005 |
| CN | 101044705 A | 9/2007 |
| EP | 1 220 557 | 7/2002 |
| WO | WO 2006/088082 | 8/2006 |
| WO | WO 2006/099437 | 9/2006 |
| WO | WO 2007/024950 | 3/2007 |

OTHER PUBLICATIONS

International Search Report and Written Opinion dated Apr. 27, 2009.
International Search Report and Written Opinion dated Jul. 1, 2010.
Korean Office Action dated Feb. 1, 2012 and English translation thereof.
Chinese Office Action dated Aug. 31, 2012 for corresponding Chinese Application No. 200880121808.8 (full translation provided).

* cited by examiner

*Primary Examiner* — Charles Shedrick
(74) *Attorney, Agent, or Firm* — Harness, Dickey & Pierce

(57) ABSTRACT

In one embodiment, the method of carrier handoff includes receiving a measurement report from a mobile providing information regarding path loss as measured at the mobile for a serving one of the multiple carriers on the downlink. The serving carrier is the carrier over which the mobile communicates on the uplink. The method further includes selectively sending an instruction to the mobile to handoff to a non-serving one of the multiple carriers depending on whether a threshold requirement associated with the serving carrier has been met. Meeting the threshold requirement is based on the received measurement report, and each of the multiple carriers has an associated threshold requirement.

13 Claims, 5 Drawing Sheets

UPLINK CARRIER HANDOFF AND METHOD FOR PATH LOSS BASED TRIGGERING OF UPLINK CARRIER HANDOFF

BACKGROUND

One of the major challenges operators face in deployment of 3G networks, such as UMTS, is the ability to provide broadband speeds to users throughout the entire cell. In typical network deployments, the users at the cell edge often get served with much smaller data rates compared to users closer to the base station. While proper link budget planning and cell site placement can ensure that users at the cell edge are able to achieve a minimum desired data rate (e.g., 128 kbps average throughput), the reality is that cell site locations from existing 2G deployments will be used, making such minimum desired data rates difficult to achieve.

Exacerbating the situation even further, the 2G network (e.g., GSM) may have been operating in the 850 MHz band, whereas the 3G network is operating in both the 850 MHz band as well as the 1900 MHz band. The significantly increased path loss experienced at the higher carrier frequency limits the data rates that users can see at the cell edge even further; this is especially a problem in the uplink as the mobiles typically transmit at relatively low power levels (e.g., 125 mW).

Given that wireless operators may own spectrum in both a lower frequency band (such as 850 MHz) as well as a higher frequency band (1900 MHz) in a given market, wireless operators may want to assign and/or move mobiles between the multiple frequency bands or carriers. Unfortunately, the current mechanism for switching carriers (sometimes referred to as carrier handoff or inter-frequency handoff) is a lengthy process, taking up to 5 seconds to carry out. This type of delay is not acceptable in mobile wireless environments with potentially high vehicle speeds.

SUMMARY

Conventional inter-frequency or carrier handoff requires that a mobile go through a process to identify suitable candidate carriers that, according to 3GPP specifications, can take as much a five seconds to perform. The identification process requires the mobile, with respect to each candidate carrier, to carry out one or more of the following functions: (1) perform a correlation operation on the primary synchronization channel (P-SCH), (2) perform a correlation operation on the second synchronization channel (S-SCH), and (3) receive the primary common pilot channel (P-CPICH).

By contrast, at least one embodiment of the present invention does not require this identification process in performing inter-frequency or carrier handoff. As a result, in this embodiment, inter-frequency handoff may be performed an order of magnitude faster than conventional processes. For example, the carrier handoff may be accomplished in 400 ms.

In one embodiment, the method of carrier handoff includes receiving a measurement report from a mobile providing information regarding path loss as measured at the mobile for a serving one of the multiple carriers on the downlink. The serving carrier is the carrier over which the mobile communicates on the uplink. The method further includes selectively sending an instruction to the mobile to handoff to a non-serving one of the multiple carriers depending on whether a threshold requirement associated with the serving carrier has been met. Meeting the threshold requirement is based on the received measurement report, and each of the multiple carriers has an associated threshold requirement.

For example, the multiple carriers may include a higher frequency carrier and a lower frequency carrier; wherein the higher frequency carrier is at a higher frequency than the lower frequency carrier. A measurement report may be received indicating whether a received power of the serving carrier is less than a first power threshold if the serving carrier is the higher frequency carrier. A handoff instruction is sent if the measurement report indicates the received power of the serving carrier is less than the first power threshold and the serving carrier is the higher frequency carrier. Alternatively, the measurement report may indicate whether the received power of the serving carrier is greater than a second power threshold if the serving carrier is the lower frequency carrier. In this case, the handoff instruction is sent if the measurement report indicates the received power of the serving carrier is greater than the second power threshold and the serving carrier is the lower frequency carrier.

Another embodiment includes requesting a mobile to send at least one measurement report associated with downlink measurements of at least one carrier in the multi-carrier communication system. The measurement report is received without a candidate carrier identification delay, and the mobile is selectively instructed to handoff to one of the carriers in the multi-carrier communication system based on the received measurement report.

Yet another embodiment includes receiving a request for a measurement report, and generating a measurement report associated with at least one of the multiple carriers in response to the received request without having to perform a candidate carrier identification process.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
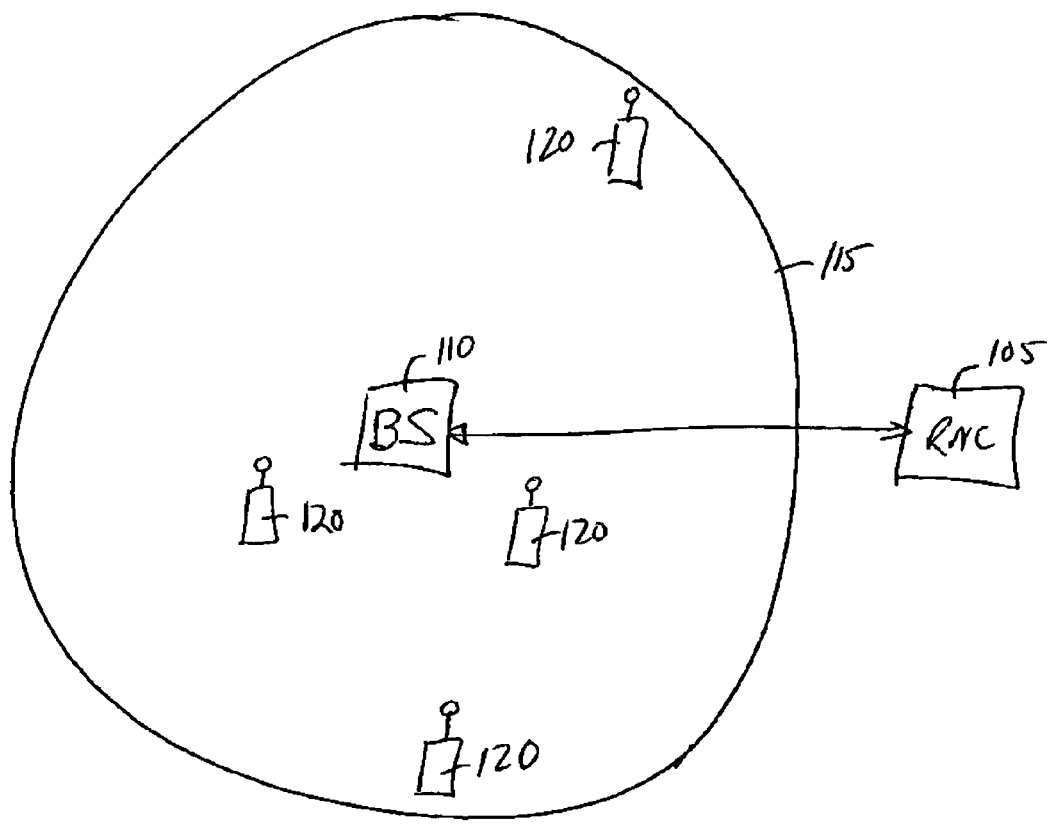
FIG. 1 illustrates a portion of a multiple carrier wireless telecommunications system according to an embodiment of the present invention.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station, NodeB, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

FIG. 1 illustrates a portion of a multiple carrier wireless telecommunications system 100 according to an embodiment of the present invention. As shown, the wireless telecommunications system 100 includes a radio network controller (RNC) 105 communicatively coupled to one or more base stations 110. For the sake of clarity, only a single base station 110 is shown. The RNC 105 may be communicatively coupled to the one or more base stations 110 by any of a variety of wired and/or wireless links. Signals passed between the RNC 105 and the one or more base stations 110 may pass through one or more other devices (not shown), such as, routers, switches, networks or the like.

Each base station 110 is associated with at least one cell 115. Each cell 115 corresponds to a geographic area having a given radius. The base station 110 supports transmission and reception over multiple carriers. A plurality of mobiles 120 may be located in the cell 115 at any one time. The mobiles 120 listen to more than one carrier of the base station 110 on the downlink, but only transmit on one carrier of the base station 110 on the uplink. However, the mobile stations 120 may also listen to carrier from other base stations on the downlink. The carrier over which a mobile 120 transmits on the uplink is referred to as the serving carrier for the mobile 120. Accordingly, the serving carrier provides signaling on the downlink to support the uplink traffic of the mobile 120; but otherwise, downlink communication to the mobile 120 may be over any one or more of the carriers. In particular, the mobiles 120 perform the processes to connect to multiple carriers and receive data on the downlink from any of the carriers.

As such, if handoff from a current serving carrier to a new serving carrier is required for a mobile 120, the mobile 120 does not need to perform a process of identifying candidate carriers to which the mobile may handoff. Namely, the mobile 120 has already established connections with carriers other the than the serving carrier, and may handoff to one of these non-serving carriers without incurring the delay associated with the identification of candidate carriers. For example, during call set up, the mobile 120 identifies the carriers and begins listening to the carriers prior to receiving measurement report requests (as discussed below) or handoff instructions (also discussed below).

Figure 2:
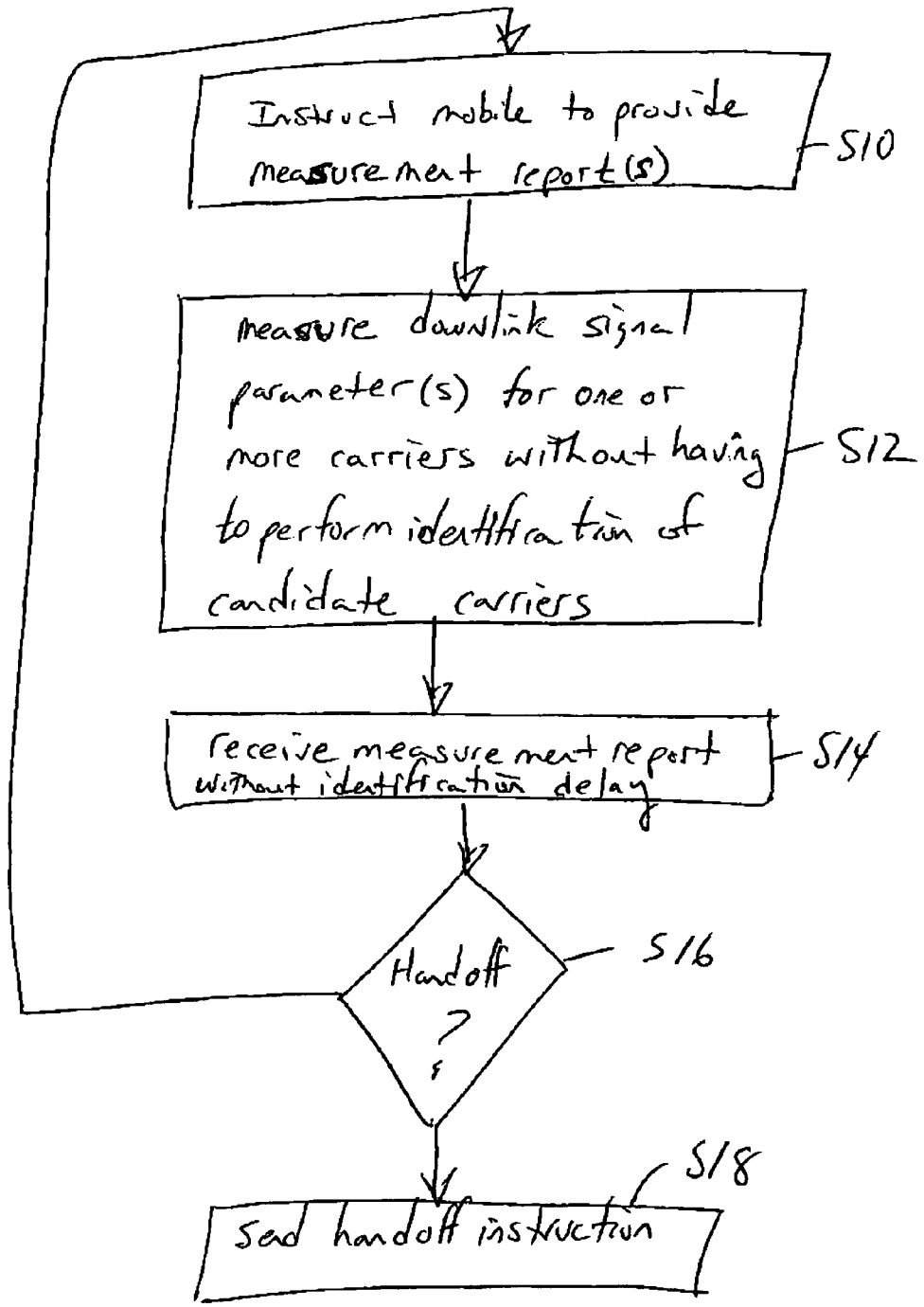
FIG. 2 illustrates a method of carrier handoff according to one embodiment of the present invention.

FIG. 2 illustrates this method of uplink carrier handoff according to one embodiment of the present invention. The method of FIG. 2 will be described in relation to the wireless telecommunications system 100, but it will be understood that this embodiment is not limited to the wireless telecommunications system 100 of FIG. 1. Furthermore, while FIG. 2 describes the method with respect to a single mobile, it will be appreciated that the method may be performed for more than one mobile. And, these performances may be in parallel.

As shown, in step S10, the RNC 105 instructs a mobile 120 to provide measurement report(s) for downlink measurements made on one or more of the carriers. In response, in step S12 the mobile 120 measures, for the downlink, one or more signal parameters associated with the one or more of the carriers to which the mobile 120 is connected, and the mobile 120 makes these measurements without having to perform a process of identifying candidate carriers. As a result, in step S14, the RNC 105 receives, via the base station 110, the measurement report(s) on the uplink without the delay associated with the mobile 120 having to perform identification of candidate carriers.

In step S16, the RNC 105 determines whether to instruct the mobile 120 to switch to a non-serving carrier as the serving carrier based on the measurement report(s). Numerous variations of measurement reports and the basis for deciding uplink handoff using those measurement reports may exist and be developed. Below, with respect to FIGS. 3-5, one example embodiment of the measurement reports and basis for deciding uplink handoff are provided. However, it will be understood that the general uplink handoff methodology of the present invention, is not limited to this example.

Returning to FIG. 2, if the RNC 105 determines not to handoff from the serving carrier, processing returns to step S10. However, if the RNC 105 determines to handoff from the serving carrier, the RNC 105 sends the handoff instruction to the mobile 120 via the base station 110 in step S18. In response, the mobile 120 will begin transmitting on the uplink over a new serving carrier.

Next, a detailed embodiment for uplink carrier handoff in a multiple carrier communication system will be described. For ease of explanation, assume the base station 110 supports two carriers in this embodiment, wherein one carrier is a higher frequency carrier than the other carrier. For example the higher frequency carrier may be 1900 MHz and the lower frequency carrier may be 850 MHz. Accordingly, in this embodiment, the mobiles 120 listen to both the higher and the lower frequency carriers on the downlink, but the mobiles 120 transmit on the uplink over only one of the higher and lower frequency carriers. It will be appreciated from this disclosure that the present invention is not limited to the assumptions given above, and that these assumptions have been made only for the purposes of simplifying the explanation of the embodiments of the present invention.

Figure 3:
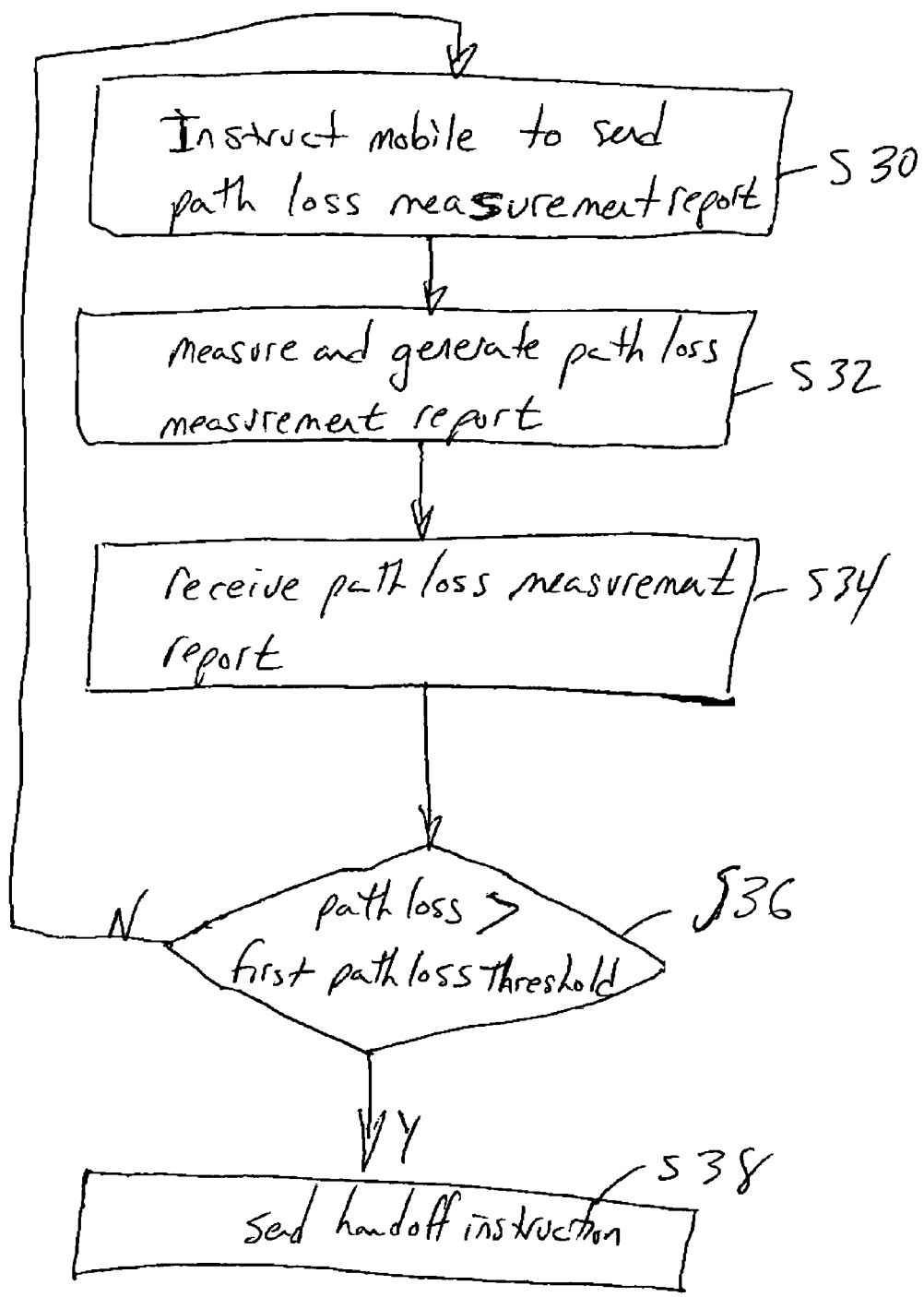
FIG. 3 illustrates a method of carrier handoff performed for a mobile having a higher frequency carrier as the serving carrier according to an embodiment.

FIG. 3 illustrates the method of uplink handoff performed by the RNC 105 for a mobile 120 having the higher frequency carrier as the serving carrier. As shown, in step S30, the RNC 105 instructs the mobile 120 to send a path loss measurement report for the higher frequency carrier. In response the mobile 120 measures at least one signal parameter of the higher frequency carrier on the downlink and generates the path loss measurement report in step S32. The path loss measurement report indicates the path loss, as measured at the mobile 120, for the higher frequency carrier on the downlink. As described above with respect to FIG. 2, the mobile 120 generates the measurement report without having to perform a candidate carrier identification process. For example, the mobile 120 may measure the received signal code power (RCSP) for the higher frequency carrier on the downlink, and generate a reporting indicating whether the measured RCSP falls below a first power threshold. As will be appreciated, this particular measurement report or reporting mechanism is already supported via the EVENT 1F reporting in the current 3GPP specification.

In step S34, the RNC 105 receives the path loss measurement report sent by the mobile 120. As described above with respect to FIG. 2, this measurement report is received without a candidate carrier identification process delay. Then, in step S36 the RNC 105 determines if the path loss exceeds a first path loss threshold based on the measurement report. If so, the RNC 105 sends the mobile 120 an instruction to handoff to the lower frequency carrier in step S38. Assuming the example measurement report described above with respect to step S32, if the measurement report indicates the measured RCSP falls below a first power threshold, then in step S36 the RNC 105 determines the path loss has exceeded the first path loss threshold and sends the mobile 120 an instruction to handoff to the lower frequency carrier in step S38.

If the path loss does not exceed the first path loss threshold (e.g., the measurement report indicates the measured RCSP has not fallen below the first power threshold), then processing returns to step S30.

Figure 4:
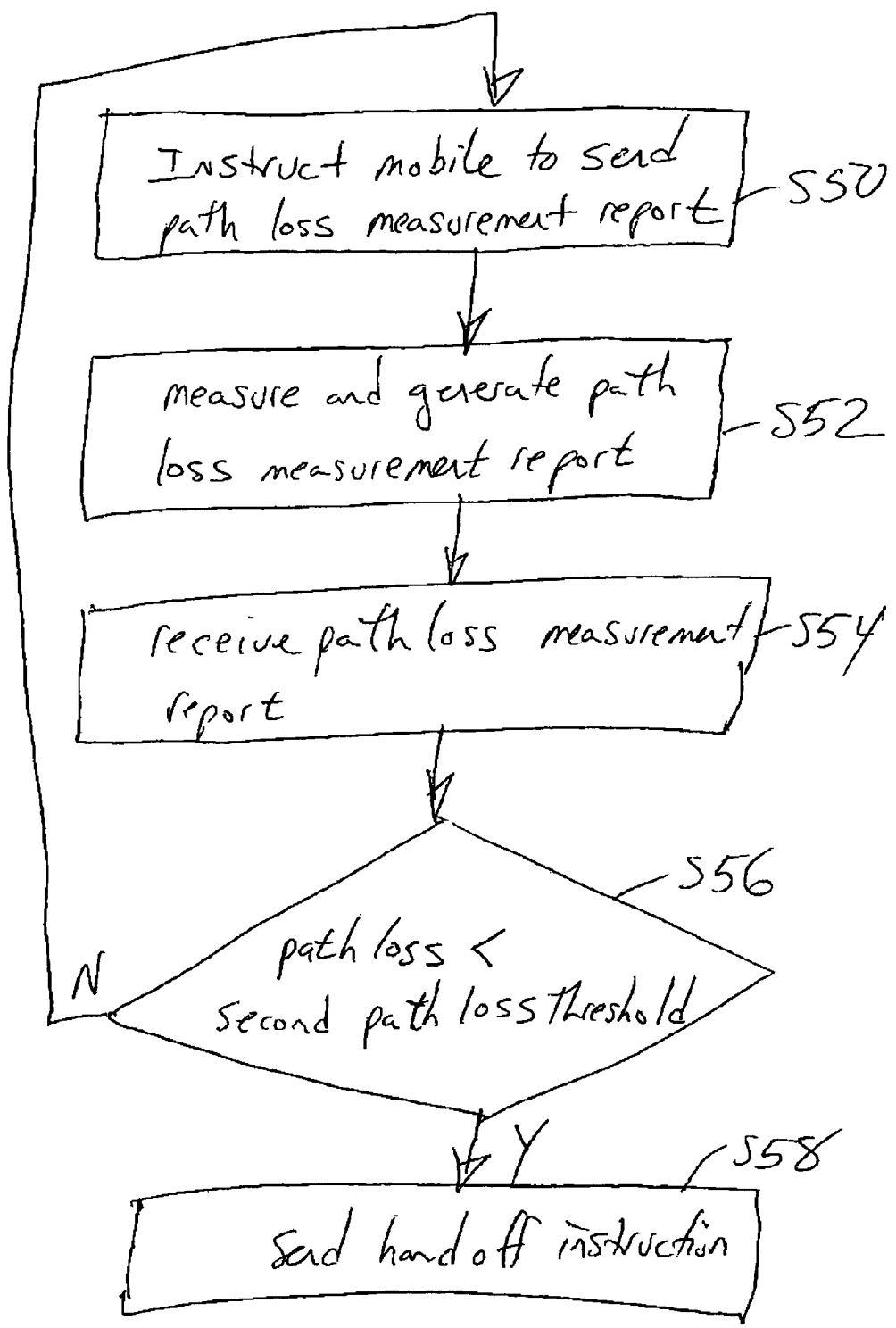
FIG. 4 illustrates a method of carrier handoff performed for a mobile having a lower frequency carrier as the serving carrier according to an embodiment.

FIG. 4 illustrates the method of uplink handoff performed by the RNC 105 for a mobile 120 having the lower frequency carrier as the serving carrier. As shown, in step S50, the RNC 105 instructs the mobile 120 to send a path loss measurement report for the lower frequency carrier. In response the mobile 120 measures at least one signal parameter of the lower frequency carrier on the downlink and generates the path loss measurement report in step S52. As described above with respect to FIG. 2, the mobile 120 generates the measurement report without having to perform a candidate carrier identification process. The path loss measurement report indicates the path loss, as measured at the mobile 120, for the lower frequency carrier on the downlink. For example, the mobile 120 may measure the received signal code power (RCSP) for the lower frequency carrier on the downlink, and generate a reporting indicating whether the measured RCSP exceeds a second power threshold. As will be appreciated, this particular measurement report or reporting mechanism is already supported via the EVENT 1F reporting in the current 3GPP specification.

In step S54, the RNC 105 receives the path loss measurement report sent by the mobile 120. As described above with respect to FIG. 2, this measurement report is received without a candidate carrier identification process delay. Then, in step S56 the RNC 105 determines if the path loss falls below a second path loss threshold based on the measurement report. If so, the RNC 105 sends the mobile 120 an instruction to handoff to the higher frequency carrier in step S58. Assuming the example measurement report described above with respect to step S52, if the measurement report indicates the measured RCSP exceeds a second power threshold, then in step S56 the RNC 105 determines the path loss has fallen below the second path loss threshold and sends the mobile 120 an instruction to handoff to the higher frequency carrier in step S58.

If the path loss does not fall below the second path loss threshold (e.g., the measurement report indicates the measured RCSP has not exceeded the second power threshold), then processing returns to step S50.

Figure 5:
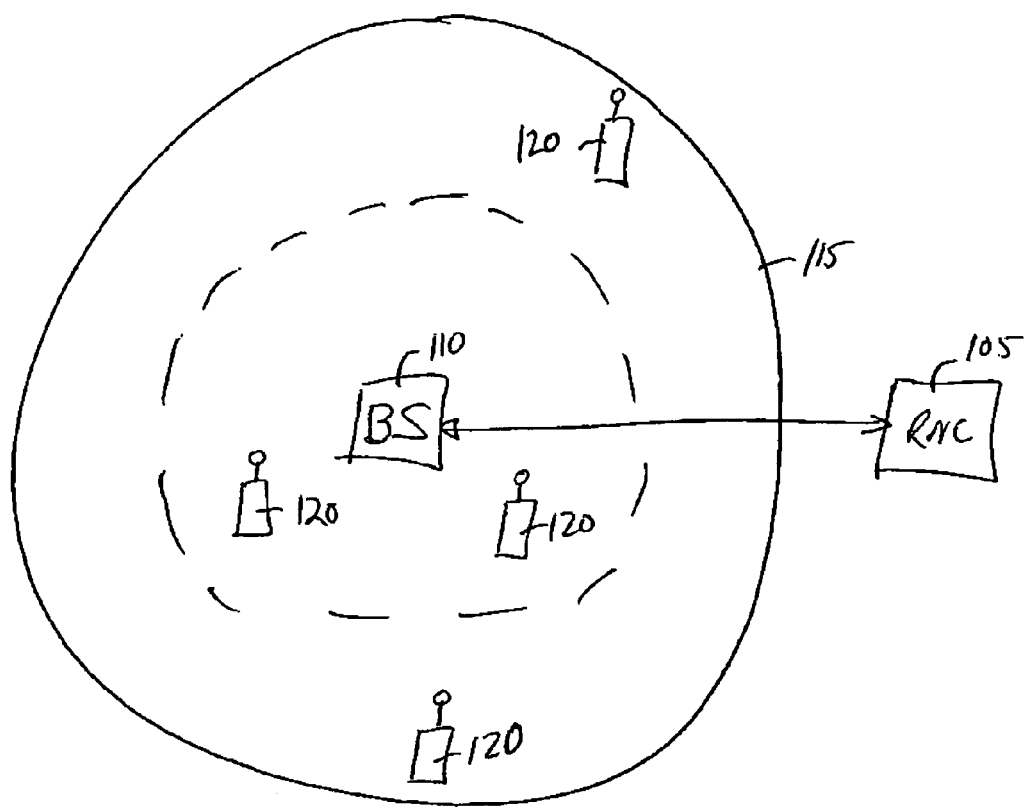
FIG. 5 illustrates coverage zones, for the respective carriers, that may be created according to the methods of FIGS. 3 and 4.

As will be appreciated, the lower carrier frequency is able to travel a much further distance than the higher frequency carrier without attenuating. Hence, the path loss based uplink handoff method of FIGS. 3 and 4 may advantageously assign the lower frequency carrier (e.g. 850 MHz) to the mobiles 120 that are at the edge of the cell and balance the load on the carriers by assigning the mobiles near the interior of the cell to the higher frequency carrier (1900 MHz) as shown in FIG. 5. This has the added effect of allowing higher data rates for mobiles at the cell edge because of the more advantageous carrier frequency. Namely, the first and second path loss thresholds, or more particularly, the first and second power thresholds, may be established based on the differences in propagation characteristics between the higher and lower frequency carriers to establish the size of the higher frequency carrier and lower frequency carrier coverage zones.

For example, the coverage zones may be established to substantially reduce or eliminate overlap of the zones. Assuming the higher frequency carrier is at 1900 MHz and the lower frequency carrier is at 850 MHz, it is well-known that there is a 10 dB path loss difference between these two carriers. Accordingly, the second power threshold may be set equal to the first power threshold plus 10 dB to achieve the reduced or eliminated overlap in coverage zones.

Alternatively, the first and second power thresholds may be set to establish a hysteresis effect and prevent the mobile from ping-ponging between the two carriers.

While the embodiments have been described with respect to inter-carrier handoff for carrier from a single base station, it will be understood that the handoff methodologies may be expanded to include carrier from multiple base stations.

Furthermore, while the handoff methodology is described as being performed as the RNC, it will be understood that the methodology could be performed at other network elements such as the base station, etc.

The invention being thus described, it will be obvious that the same may be varied in many ways. Such variations are not to be regarded as a departure from the invention, and all such modifications are intended to be included within the scope of the invention.

I claim:

1. A method of uplink carrier handoff in a multiple carrier communication system, the multiple carriers include a higher frequency carrier and a lower frequency carrier, the higher frequency carrier being at a higher frequency than the lower frequency carrier, the method comprising:
   receiving, by a network element, a measurement report from a mobile providing information regarding path loss as measured at the mobile for a serving one of the multiple carriers on the downlink, the serving carrier being the carrier over which the mobile communicates on the uplink; and
   selectively sending, by the network element, an instruction to the mobile to handoff to a non-serving one of the multiple carriers depending on whether a threshold requirement associated with the serving carrier has been met, the meeting of the threshold requirement being based on the received path loss, and each of the multiple carriers having an associated threshold requirement,
   wherein the associated threshold requirements for the higher frequency carrier and the lower frequency carrier are established based on differences in propagation characteristics of the higher frequency carrier and the lower frequency carrier,
   wherein each of the multiple carriers is associated with a different threshold requirement.

2. The method of claim 1, wherein the received measurement report provides information on received power of the serving carrier as the path loss information.

3. The method of claim 2, wherein
   the received measurement report indicates whether the received power meets the threshold requirement associated with the serving carrier.

4. The method of claim 1, wherein
   the receiving receives a measurement report indicating whether a received power of the serving carrier is less than a first power threshold if the serving carrier is the higher frequency carrier; and
   the sending sends the handoff instruction if the measurement report indicates the received power of the serving carrier is less than the first power threshold and the serving carrier is the higher frequency carrier.

5. The method of claim 4, wherein
   the receiving receives a measurement report indicating whether the received power of the serving carrier is greater than a second power threshold if the serving carrier is the lower frequency carrier; and
   the sending sends a handoff instruction if the measurement report indicates the received power of the serving carrier is greater than the second power threshold and the serving carrier is the lower frequency carrier.

6. The method of claim 5, wherein the second power threshold is greater than the first power threshold.

7. The method of claim 4, wherein the method further comprises:
   assigning the lower frequency carrier to the mobile that is at an edge of a cell, and
   assigning the higher frequency carrier to the mobile near an interior of the cell.

8. The method of claim 5, wherein the method further comprises:
   assigning the lower frequency carrier to the mobile that is at an edge of a cell, and
   assigning the higher frequency carrier to the mobile near an interior of the cell.

9. The method of claim 1, wherein
   the receiving receives a measurement report indicating whether the received power of the serving carrier is greater than a power threshold if the serving carrier is the lower frequency carrier; and
   the sending sends a handoff instruction if the measurement report indicates the received power of the serving carrier is greater than the power threshold and the serving carrier is the lower frequency carrier.

10. The method of claim 1, wherein
    the receiving receives a measurement report indicating whether the pass loss of the serving carrier is greater than a first threshold if the serving carrier is the higher frequency carrier; and
    the sending sends a handoff instruction if the measurement report indicates the path loss of the serving carrier is greater than the first threshold and the serving carrier is the higher frequency carrier.

11. The method of claim 10, wherein
    the receiving receives a measurement report indicating whether the path loss of the serving carrier is less than a second threshold if the serving carrier is the lower frequency carrier; and
    the sending sends a handoff instruction if the measurement report indicates the path loss of the serving carrier is less than the second threshold and the serving carrier is the lower frequency carrier.

12. The method of claim 1, wherein
    the receiving receives a measurement report indicating whether the path loss of the serving carrier is less than a threshold if the serving carrier is the lower frequency carrier; and
    the sending sends a handoff instruction if the measurement report indicates the path loss of the serving carrier is less than the threshold and the serving carrier is the lower frequency carrier.

13. The method of claim 1, wherein a higher frequency band includes the higher frequency carrier and a lower frequency band includes the lower frequency carrier.

* * * * *